UNITED STATES PATENT OFFICE.

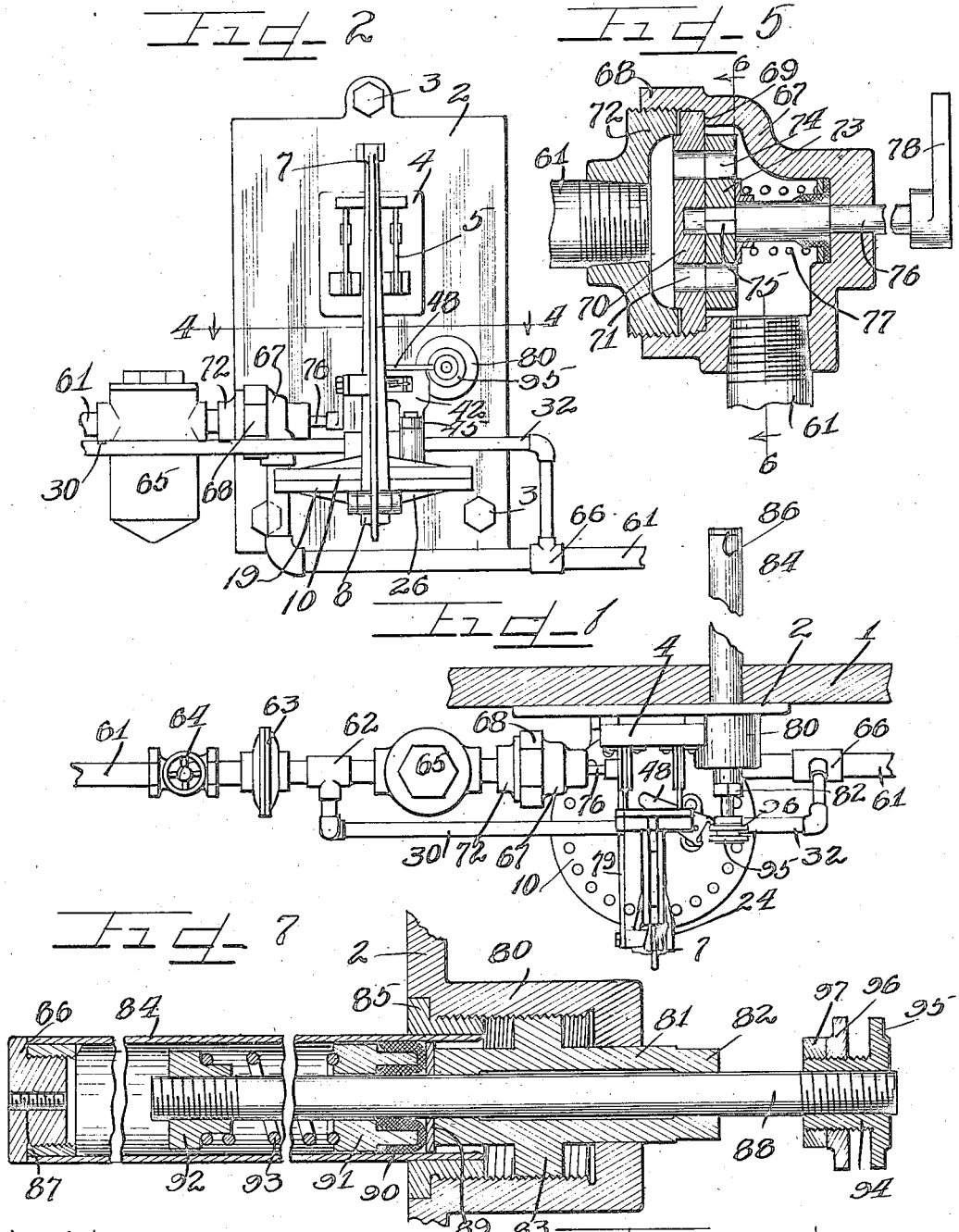

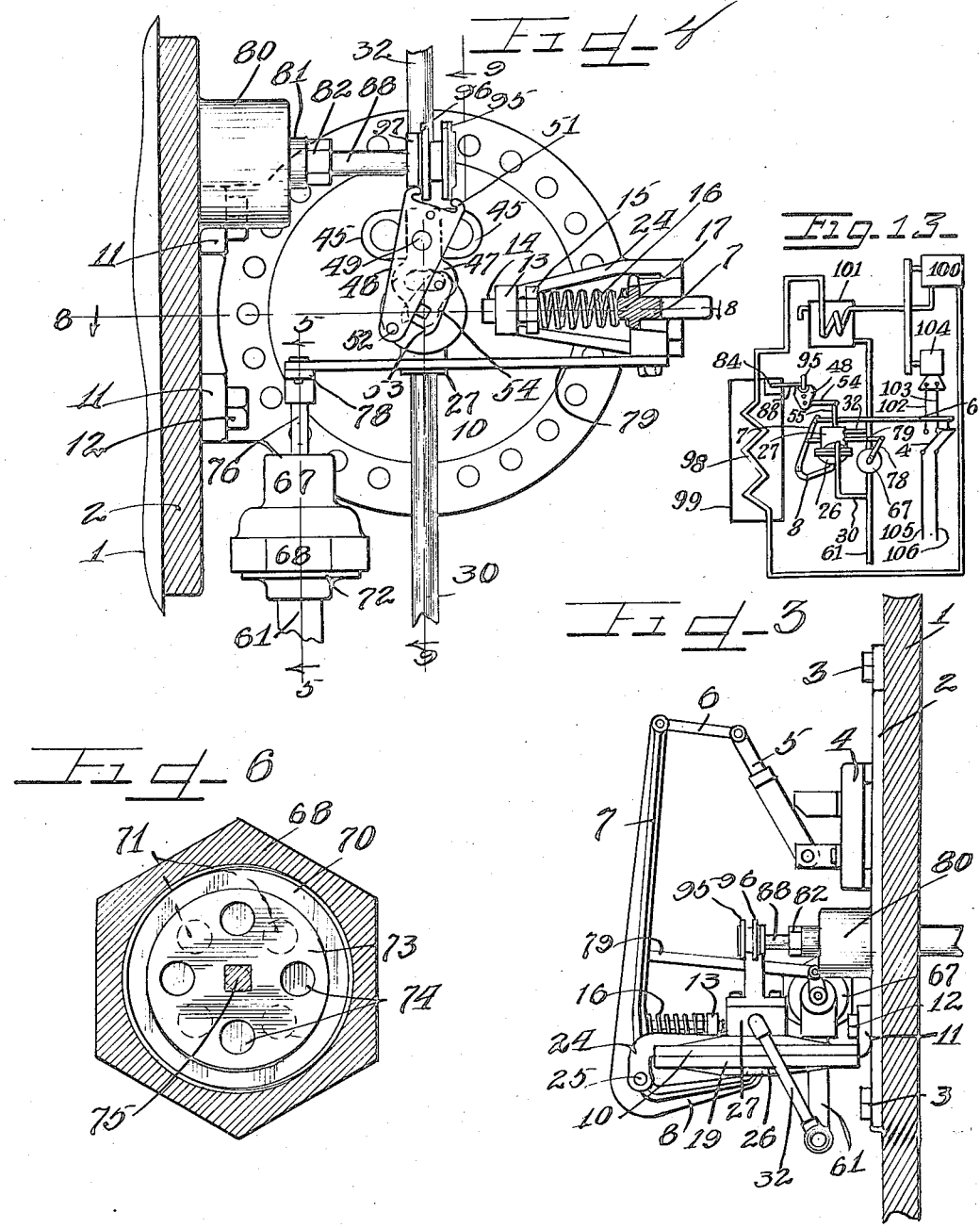

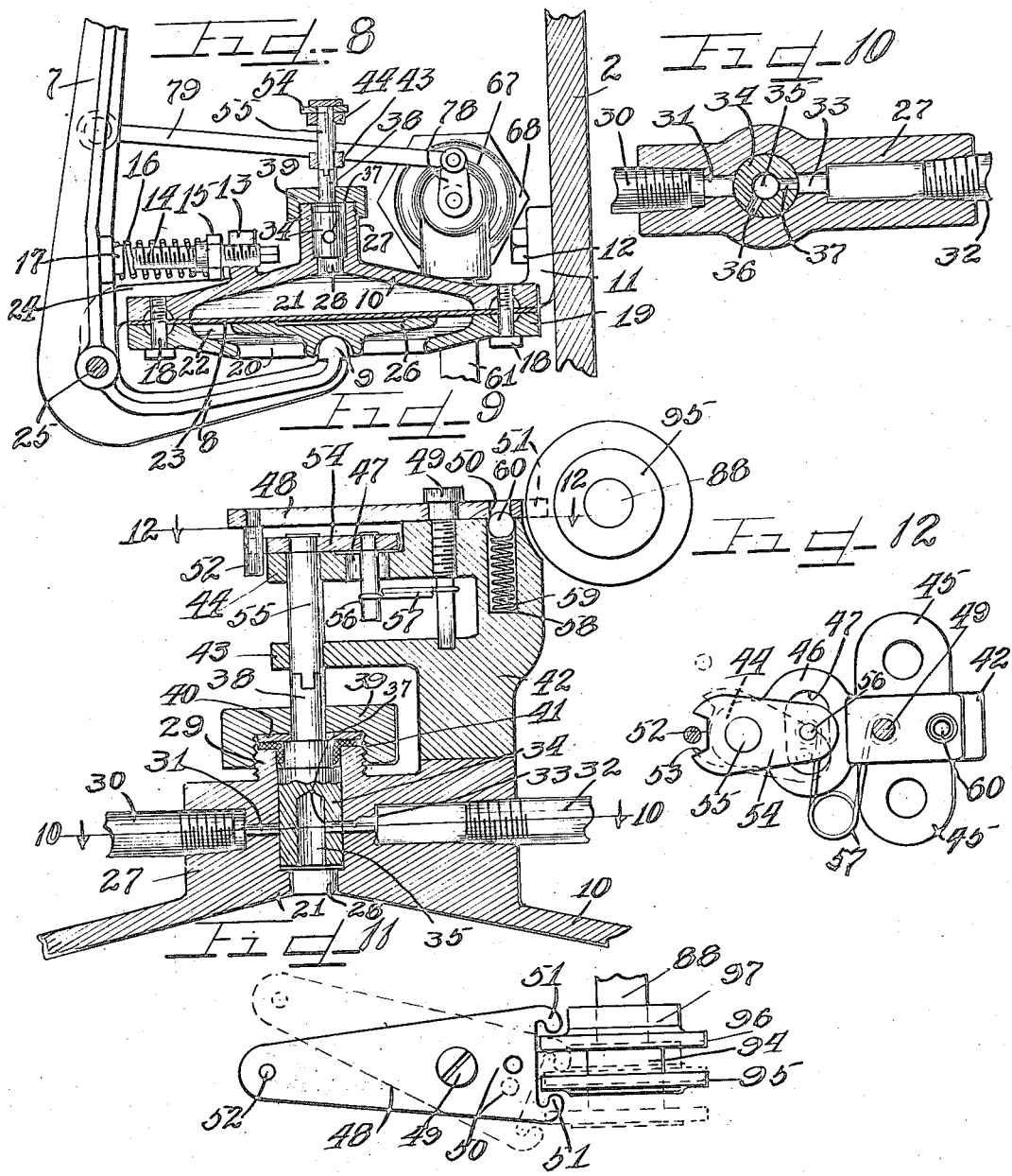

WILLIAM WISHART AND ALBERT H. MORRELL, OF CLINTON, IOWA, ASSIGNORS TO CLINTON REFRIGERATING COMPANY, OF CLINTON, IOWA, A CORPORATION OF IOWA.

THERMOSTATIC CONTROL DEVICE FOR REFRIGERATING PLANTS.

1,403,219.           Specification of Letters Patent.      Patented Jan. 10, 1922.

Application filed September 8, 1919. Serial No. 322,385.

*To all whom it may concern:*

Be it known that we, WILLIAM WISHART and ALBERT H. MORRELL, both citizens of the United States, and both residents of the city of Clinton, in the county of Clinton and State of Iowa, have invented certain new and useful Improvements in a Thermostatic Control Device for Refrigerating Plants; and we do hereby declare that the following is a full, clear, and exact description of the same, reference being had to the accompanying drawings, and to the numerals of reference marked thereon, which form a part of this specification.

This invention relates to an improved type of a thermostatically controlled device adapted to automatically supply cold water from a main water supply line to the condenser coils of a refrigerating plant and to cause operation of the compressor to permit cooling of the refrigerant liquid of the refrigerating plant when necessary.

It is an object of this invention to provide a device adapted to automatically control the operation of the condenser and the compressor of a refrigerating plant.

It is also an object of the invention to construct a thermostatically controlled device for automatically starting the driving motor of a refrigerant compressor and simultaneously causing cooling water to be pumped through the refrigerant condenser of the refrigerating plant.

A further object of the invention is the construction of a device wherein a thermostat installed in the compartment to be cooled is operated to regulate the refrigerating action by automatically controlling the supply of cooling water to a condenser, and the operation of the driving motor of the refrigerating plant compressor.

Another object of this invention is the construction of a device for controlling the operation of a valve and a switch which respectively govern the condenser and the compressor of a refrigerating plant.

It is furthermore an object of the invention to provide a refrigerating plant controlling device wherein a thermostat is governed by the pressure of the condenser water to cause opening of a condenser water supply line valve, and the closing of a switch to start the motor which drives the refrigerating plant compressor.

It is an important object of this invention to provide a refrigerating plant controling device wherein a water supply valve and a motor switch are operated by a thermostatically controlled pressure diaphragm.

Other and further important objects of this invention will be apparent from the disclosures in the specification and drawings.

The invention (in a preferred form) is illustrated in the drawings and hereinafter more fully described.

On the drawings:

Figure 1 is a top plan of the control device partly broken away and with the mounting wall shown in section.

Figure 2 is a front elevation thereof with parts omitted.

Figure 3 is a side elevation of the device.

Figure 4 is an enlarged sectional view taken on line 4—4, of Figure 2.

Figure 5 is an enlarged detail section of the water control valve, taken on line 5—5, of Figure 4, with parts disclosed in elevation.

Figure 6 is a detail section of the valve taken on line 6—6, of Figure 5.

Figure 7 is an enlarged longitudinal section of the thermostat.

Figure 8 is a detail section of the diaphragm mechanism taken on line 8—8, of Figure 4, showing parts in elevation.

Figure 9 is an enlarged fragmentary section taken on line 9—9, of Figure 4, showing parts in elevation.

Figure 10 is a detail section of the diaphragm valve, taken on line 10—10, of Figure 9, with parts in elevation.

Figure 11 is an enlarged detail plan view of the outer end of the thermostat rod shown associated with the diaphragm valve control lever, and indicating the operation in dotted lines.

Figure 12 is a detail plan view taken on line 12—12, of Figure 9.

Figure 13 is a diagram of the entire plant.

As shown on the drawings:

The reference numeral 1, indicates a wall of a refrigerator upon which the control device embodying the principles of this invention is mounted. The device comprises a mounting plate or board 2, which is rigidly secured on the wall 1, by screw bolts 3, or other suitable means. Securely mounted upon the upper central portion of the mounting plate 2, is a double-pole single-throw knife switch 4, having two of the terminals thereof connected with a power line, and the remaining two terminals connected by wires with the terminals of a driving motor for the compressor of a refrigerating plant. Pivotally connected to the outer end of the switch handle 5, is one end of a connecting rod 6, the other end of which is pivotally connected to the free end of the long arm 7, of a bell-crank. The short arm of the bell-crank is indicated by the reference numeral 8, and has the rounded end bent to form a finger 9.

Associated with the short arm 8, of the bell-crank is a diaphragm casing comprising a flanged conical upper section 10, having supporting lugs 11, integrally formed thereon and rigidly secured to the mounting plate 2, by screw bolts 12. Integrally formed upon the top of the upper casing section 10, is a vertical lug or projection 13, provided with a threaded passage through which is threaded an adjusting screw 14, having a squared head on the inner end thereof to facilitate turning of the screw. Adjustably threaded on the screw 14, is a nut 15, against which one end of a coil spring 16, is engaged. The spring 16, is coiled around the screw 14, and has the other end thereof engaging a projection 17, secured or formed on the lower portion of the long bell-crank arm 7, to normally hold said long arm projected outwardly away from the mounting plate 2. The screw 14, and the nut 15, may be adjusted to regulate the pressure exerted by the spring 16, on the bell-crank arm 7.

Removably secured to the flange of the upper diaphragm casing section 10, by screw bolts 18, is the flange of a lower diaphragm casing section 19, which is provided with a central opening 20. The chamber 21, of the upper casing section 10, is separated from the open chamber 22, of the lower casing section 19, by means of a pressure actuated diaphragm 23, which is clamped between the flanges of the casing sections, and held in place by the screw bolts 18, as clearly shown in Figure 8. Integrally formed on the upper casing section 10, is an outwardly and downwardly projecting bracket 24, provided with a pivot pin 25, on which the bight portion of the bell-crank 7—8, is pivotally mounted. The bell-crank controlling spring 16, serves to hold the rounded finger 9, of the short bell-crank arm 8, seated in a centrally recessed plate 26, to hold said plate against the under surface of the diaphragm 23.

Integrally formed on the top of the upper casing section 10, is a block 27, provided with a vertical cylindrical valve chamber or passage 28, which communicates at its inner end with the chamber 21, and has the upper portion extending through an externally threaded collar 29, formed on the top of the block 27. Engaged in one side of the block 27, is one end of an auxiliary water inlet pipe 30, which communicates with the valve chamber 28, through an inlet passage 31. Secured in the opposite side of the block 27, is one end of an auxiliary water outlet pipe 32, which communicates with the valve chamber 28, through an outlet passage 33. Rotatably mounted in the valve chamber 28, is a cylindrical pressure control valve 34, provided with an axial passage 35, closed at its upper end and having the lower end communicating with the valve chamber 28, and the casing chamber 21. The valve 34, is provided with a radial inlet passage 36, and a radial outlet passage 37, disposed at an angle with respect to the inlet passage 36, as shown in Figure 10. A valve stem 38, is formed on the upper end of the valve 34, and projects through a cap 39, which is threaded upon the collar 29, to hold a washer 40, and a packing member 41, in place to form a water tight joint.

Mounted upon the block 27, is a bracket 42, having integrally formed thereon a lower horizontal arm 43, and an upper horizontal arm 44. Apertured lugs 45, are formed at right angles on the lower portion of the bracket 42, to permit the bracket to be bolted to said block 27. The outer end of the upper bracket arm 44, is reduced in thickness and has integrally formed thereon an enlarged portion 46, provided with a slot 47, which extends transversely of the arm 44. A lever 48, is pivotally mounted upon the top of the bracket 42, by means of a headed screw pin member 49, which threads through the upper bracket arm 44, and has the lower plain pin end thereof seated in the lower bracket arm 43, as disclosed in Figure 9. The lever 48, is flat and tapers toward one end. Provided in the wide end of the lever is an opening for aperture 50. The wide end of the lever is cut away to provide a pair of hooks or arms 51, which are directed toward one another. A downwardly directed pin 52, is rigidly secured in the pointed or narrow end of the lever 48, and is adapted to project through a notch 53, formed in the wide end of a flat tapered lower lever 54. The lever 54, is pivotally mounted on the upper bracket arm 44, by means of an upper valve stem section 55, which projects downwardly through openings formed in the outer ends of the bracket arms 43 and 44. The lower end of the upper valve stem section 55, is provided with a tenon which seats in a diametric slot in the upper end of the valve stem 38, to afford a means whereby the valve 34, may be rotated. A pin 56, is secured on the inner pointed end of the lower lever 54, and said pin projects downwardly through the slot 47, and has one arm of a coiled spring 57, attached thereto. The other arm of the spring 57, is connected to the lower portion of the screw member 49. A recess or pocket 58, is provided in the upper portion of the brackets 42, and seated in said pocket is a coiled spring 59, which has a ball 60, seated on the top thereof. The spring 59, serves to hold the ball 60, seated in the lower end of the lever opening 50.

The main water supply or feed pipe is indicated by the reference numeral 61, and connected in said pipe by means of a three way connector 62, is one end of the auxiliary inlet pipe 30. Connected in the main water pipe 61, to the outside of the connector 62, is a strainer 63, and a shut-off valve 64. Connected in the pipe 61, on the opposite side of the connector 62, is a pressure reducing valve 65, of any standard type. A main control gridiron-valve is connected in the pipe 61, with the pressure reducing valve 65. The end of the auxiliary outlet pipe 32, may be connected in the main pipe 61, by means of a three-way connector 66, disposed on the opposite side of the main control valve from the pressure reducing valve 65.

The main control gridiron-valve (Figures 5 and 6) embraces a casing 67, closed at one end and open at the other end. Integrally formed on the open end of the casing 67, is an internally threaded nut portion 68, which affords a shoulder 69, within the casing. Seated within the nut portion 68, of the valve casing against the shoulder 69, is a stationary grid plate 70, provided with a plurality of openings or apertures 71. A closure plate 72, is threaded into the nut portion 68, against the valve grid plate 70, to hold the same in position. The water main 61, is cut at the gridiron valve, and has the cut ends threaded to permit one end to be threaded into the closure plate 72, while the other end is threaded into a threaded opening provided in the bottom of the casing 67, as shown in Figure 5. Disposed within the valve casing 67, adjacent the inner surface of the stationary grid plate 70, is a rotatable grid plate 73, provided with a plurality of openings or apertures 74, and a central squared aperture. The rotatable grid plate 73, is supported in position on the squared portion 75, formed near the inner end of a valve stem 76. The inner end of said valve stem 76, is cylindrical and is journalled in a recess formed in the center of the inner surface of the stationary grid plate 70. The middle section of the valve stem 76, is of enlarged diameter and has one shoulder thereof contacting the rotatable grid plate 73, and the other shoulder disposed adjacent the end wall of the casing 67, thereby preventing longitudinal movement of the rotatable grid plate. A packing member for the water valve is engaged around the enlarged portion of the stem 76. Also disposed within the valve casing 67, around the enlarged portion of the valve stem is a coiled spring 77, adapted to contact and hold the rotatable grid plate tightly seated against the stationary grid plate 70. The valve stem 76, projects outwardly through the closed end of the valve casing and has securely engaged on the end thereof one end of the crank 78. Pivotally connected to the other end of the crank 78, is one end of a connecting link or rod 79, the other end of which is pivotally connected to the long arm 7, of the bell-crank.

The operation of the diaphragm, which controls the operation of the bell-crank 7—8, is governed by the valve 34, which in turn is governed by a thermostat shown in detail in Figure 7. The thermostat comprises an internally threaded casing 80, integrally formed on or rigidly secured to the front surface of the mounting plate 2. The rear end of the casing 80, is open and the front end is closed and provided with a control opening. An axially passaged cylindrical plug 81, is positioned in the casing 80, and has the front end projecting outwardly through the opening in the front wall of the casing 80. The projecting end of the plug 81, is squared to form a nut 82. Integrally formed peripherally on the plug 81 intermediate the ends thereof, is a threaded collar or flange 83, which is threaded into the casing 80. The plug 81, is adjusted by rotating the same by applying a wrench to the nut portion 82. Projecting into the open rear end of the casing 80, around the rear end of the plug 81, is one end of a sleeve or shell 84, which is secured to a locking collar 85, threaded into the rear of the casing 80. The other end of the sleeve 84, is closed by a cap or plug 86. The cap 86, is provided with a threaded inlet passage whereby a liquid may be admitted into the thermostat sleeve 84, after which the passage is closed by a screw 87. Projecting longitudinally through the plug 82, and into the sleeve 84, is a rod 88, threaded at both ends. A washer 89, is disposed within the sleeve 84, around the rod 88, and adjacent the inner end of said plug 82. A grooved packing ring 90, within the sleeve 84, is held against the washer 89, by a collar or ring 91, which fits into the washer groove. Threaded on the inner end of the rod 88, is a head 92, against which one end of a coiled spring 93, is seated. The other end of said spring presses against the ring 91, to hold the packing forced against the washer 89, to form a liquid tight joint. The outer end of the thermostat rod 88, has engaged thereon a control head comprising an externally threaded sleeve 94, having integrally formed at one end thereof a ring or flange 95. Threaded onto the sleeve 94, is a ring 96, and a locking member 97. The ring 96, is adjustable with respect to the ring 95, and said rings are spaced and positioned to engage in the space afforded between the hooks 51, of the pivoted lever 48, as shown in Figure 11.

The operation is as follows:

The thermostatic control device of this invention is adapted for use in connection with a refrigerating plant wherein an expansion coil 98 in a refrigerator 99 is supplied with a refrigerating liquid by means of a motor operated compressor 100. The refrigerating plant is also provided with a condenser 101 for cooling the refrigerant liquid. The condenser is connected to the water supply pipe 61, and two of the terminals of the switch 4, are connected by suitable wires 102 and 103 to the motor 104 which operates the compressor, while the remaining switch terminals are connected with a source of power by wires 105 and 106.

Normally the switch 4, is open and the three way valve 34, is positioned with the outlet passage 37, registering with the passage 33, to release the pressure in the diaphragm casing chamber 21, to permit the diaphragm 23, to assume a horizontal position, as shown in Figure 8. The thermostat sleeve 84, projects into the refrigerator to subject the liquid in said sleeve to the temperature of the refrigerator. When the temperature in the refrigerator is low, the liquid in the thermostat sleeve 84, is cooled and contracts, thereby permitting the thermostat spring 93, to draw the rod 88 inwardly so that the thermostat head on the outer end of the rod 88, will be positioned to hold the lever 48 in its normal position as disclosed in full lines in Figure 11. The lever 48, is held locked against accidental movement by the ball 60, which is held seated in the lower end of the lever opening 50, by the spring 59.

When the temperature in the refrigerator rises above the predetermined temperature desired, the liquid in the sleeve 84, expands and acts to force the rod 88, outwardly against the action of the spring 93. Outward movement of the rod 88, causes the ring 95 to contact one of the lever hooks 51, whereby the lever 48, is swung about the pivot 49, into the dotted line position shown in Figure 11. Movement of the lever 48, causes the pin 52, to slightly swing the lower lever 54, until the pin 52, is clear of the recess 53. The spring 57, then acts to throw the lever 54, the rest of the way into the dotted line position of Figure 12. Movement of the lower lever 54, rotates the interfitting stems 55—38, thereby causing the valve 34, to move into a position wherein the passage 36 registers with the passages 31, to permit water from the supply end of the water main 61, to flow through the auxiliary pipe 30, through the passages 31, 36 and 35, into the diaphragm casing chamber 21. The pressure of the water in the chamber 21, acts to flex or depress the diaphragm 23. Downward movement of the diaphragm serves to swing the short arm 8, of the bell-crank downwardly, and the long bell-crank arm 7, is accordingly swung inwardly toward the mounting plate 2 against the action of the spring 16. The inward movement of the long bell-crank arm 7, simultaneously actuates the connecting rods 6 and 79. The rod 6, acts to close the switch 4—5, while the rod 79, swings the crank 78, to rotate the main valve stem 76, and the apertured grid plate 73, into a position wherein the openings 74, register with the openings 71, of the stationary grid plate 70, as shown in Figure 5.

The main valve 67, having been opened as shown in Figure 5, cold water is permitted to circulate through the condenser coils to cool the refrigerant liquid. With the switch 4—5, closed the refrigerating plant motor is set into operation to drive the compressor, whereby the refrigerating liquid from the refrigerator expansion coil is compressed in the compressor and forced through the condenser coils to be cooled by the cold water from the main supply pipe 61 before being returned to the expansion coil.

When the temperature in the refrigerator has again been reduced, the liquid in the thermostat sleeve 84, is contracted, thereby permitting the thermostat spring 93, to force the rod 88, inwardly so that the head plate 96, engages one of the hooks 51, of the lever 48, to swing the lever 48, back into normal position. The pin 52, on the lever 48, again engages in the notch 53, of the lower lever 54, and swings said lever 54, back into normal position. This movement of the lever 54, rotates the valve 34, into a position shown in Figure 10 wherein the passages 37 and 33, register. The pressure in the chamber 21, is thus permitted to be reduced, and the diaphragm 23, is returned to its normal position by the bell-crank 7—8, due to the action of the spring 14. Outward movement of the bell-crank arm 7, acts to close the main valve 67, and open the switch 4, to stop the operation of the refrigerating plant mechanisms.

The thermostat spring 93, is adapted to be compressed or loosened by turning the plug 81. To vary the swing of the lever 48, the ring 96 of the thermostat head, is adapted to be moved toward or away from the ring 95.

Hydrostatic pressure is necessary at all times to operate the valve and switch. Should the pressure, however fail, the spring 16, will act as a safety device, to close the valve and stop the motor.

We are aware that numerous details of construction may be varied through a wide range without departing from the principles of this invention, and we therefore do not purpose limiting the patent granted otherwise than necessitated by the prior art.

We claim as our invention:

1. The combination with a refrigerating plant motor and condenser, of a switch connected with the motor, a water supply valve connected with the condenser, a bell-crank connected to said switch and water supply valve, a diaphragm mechanism disposed to co-act with the bell-crank, a control valve governing the diaphragm mechanism, and a thermostat to operate the control valve to cause the diaphragm mechanism to operate the bell-crank to open the water supply valve and close the switch.

2. A refrigerating plant control device comprising a motor control switch, a condenser water supply valve, a bell-crank, means connecting said switch and supply valve to one arm of the bell-crank, a diaphragm mechanism associated with the other bell-crank arm, a control valve governing the operation of the diaphragm mechanism, and a thermostat adapted to automatically operate said control valve to actuate the diaphragm mechanism whereby the bell-crank is rocked to simultaneously open the supply valve and close the motor switch.

3. A refrigerating plant control device comprising a motor control switch, a condenser water supply valve, a pivoted member connected to said switch and to said supply valve, a diaphragm mechanism associated with the pivoted member, a control valve governing the operation of the diaphragm mechanism, means for operating the control valve, and a thermostat adapted to automatically actuate said means to cause rotation of the control valve and operation of the diaphragm mechanism whereby the pivoted member is moved to open the supply valve and close the motor switch.

4. In a refrigerating plant the combination with a condenser water supply pipe, a supply valve connected therein, a governing valve, auxiliary pipes connecting the governing valve with said supply pipe on opposite sides of the supply valve, a diaphragm associated with the governing valve, a motor control switch, pivoted means positioned to contact the diaphragm, said pivoted means connected with said supply valve and with said switch, a lever mechanism connected with the governing valve, and a thermostat positioned to automatically operate said lever mechanism to cause rotation of the governing valve and thereby flexing of the diaphragm, said diaphragm acting to rock the pivoted means to cause the same to simultaneously open the supply valve and close the motor control switch.

5. In a refrigerating plant control device the combination with a condenser supply valve and a motor control switch, of a diaphragm mechanism connected with the supply valve and switch, means for controlling the operation of said diaphragm mechanism, a thermostat and an adjustable head connected therewith, adapted to be actuated thereby to cause said means to operate the diaphragm mechanism whereby the valve is opened and the switch is closed.

6. A refrigerating plant control device comprising a water main, a main valve therein, a switch, a diaphragm mechanism, pivoted means connecting the same with the main valve and said switch, an auxiliary valve mechanism for governing the operation of the diaphragm mechanism, auxiliary pipes connecting the auxiliary valve mechanism with the water main on opposite sides of the main valve, a thermostat, and means automatically operated thereby adapted to actuate the auxiliary valve mechanism to cause flexing of the diaphragm mechanism and movement of said pivoted means whereby the main valve is opened and the switch is closed.

In testimony whereof we have hereunto subscribed our names in the presence of two subscribing witnesses.

WILLIAM WISHART.
ALBERT H. MORRELL.

Witnesses:
EARL M. HARDINE,
LE ROY D. KILEY.